March 25, 1952  J. M. BUCCINO ET AL  2,590,749
FASTENING DEVICE FOR BRAKE LININGS
Filed Feb. 17, 1950  2 SHEETS—SHEET 1
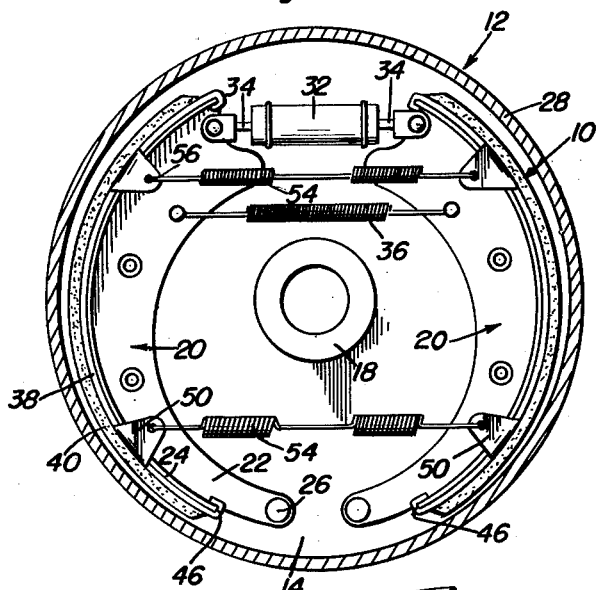
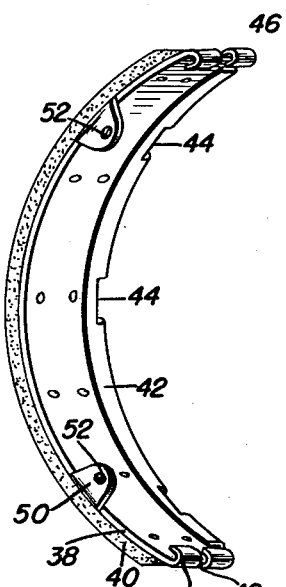
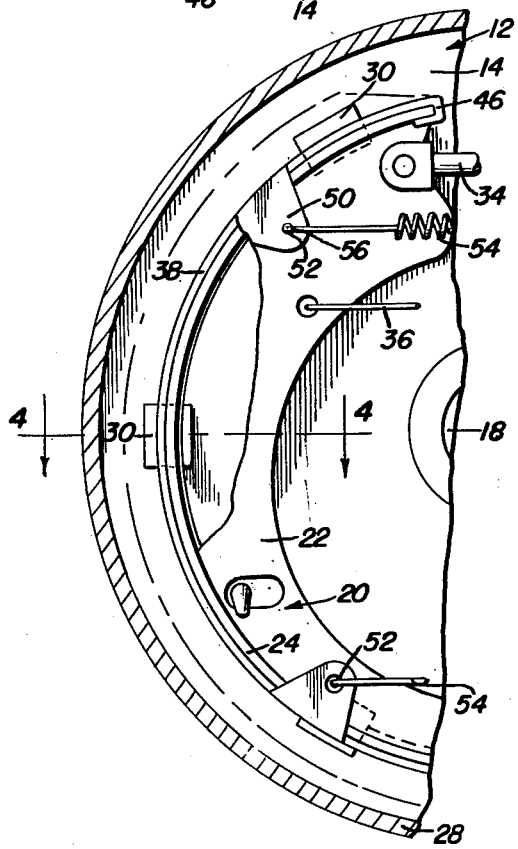
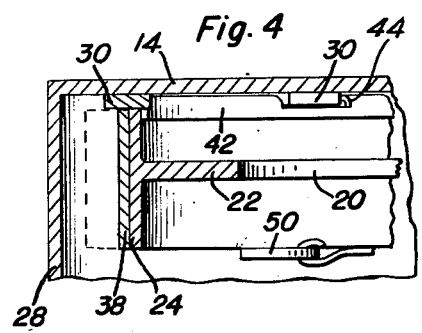
Jerry M. Buccino
Julius J. Buccino
INVENTORS March 25, 1952     J. M. BUCCINO ET AL     2,590,749
FASTENING DEVICE FOR BRAKE LININGS
Filed Feb. 17, 1950     2 SHEETS—SHEET 2
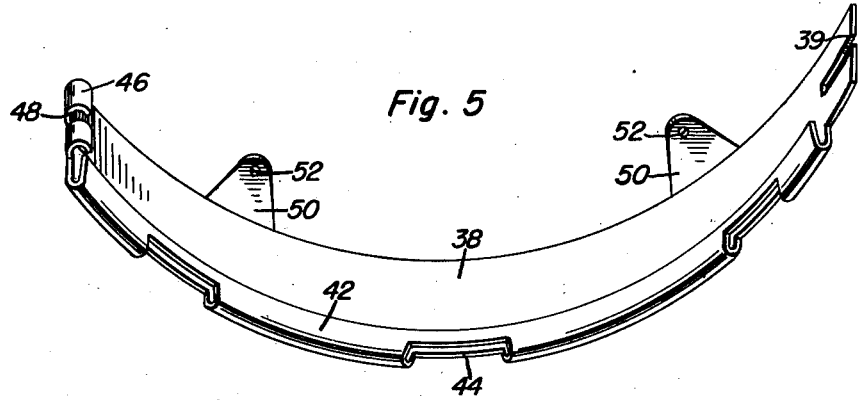
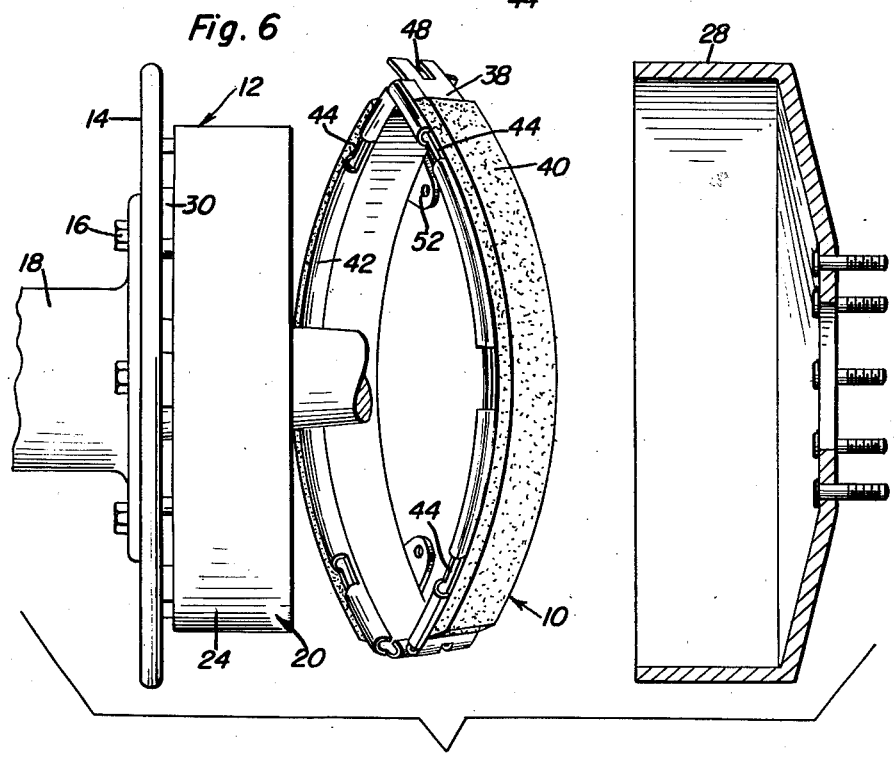
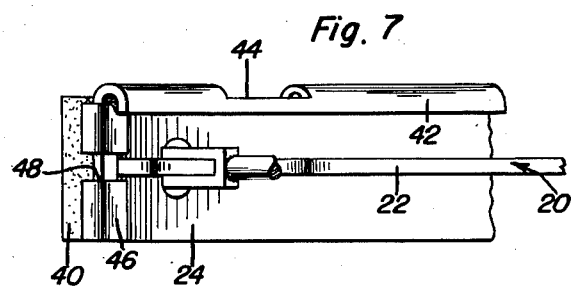
Jerry M. Buccino
Julius J. Buccino
INVENTORS Patented Mar. 25, 1952

2,590,749

UNITED STATES PATENT OFFICE 2,590,749

FASTENING DEVICE FOR BRAKE LININGS

Jerry M. Buccino and Julius J. Buccino,
Canoga Park, Calif.

Application February 17, 1950, Serial No. 144,696

3 Claims. (Cl. 188—234)

This invention comprises novel and useful improvements in brake linings, and more particularly pertains to a brake lining replacement unit.

An important object of this invention is to provide a brake lining replacement unit which may be attached to, or detached from, conventional brake shoes without modifying the structure thereof, and without removing the shoes from the backing plate upon which they are movably mounted.

Another object is to provide a brake lining replacement unit in accordance with the foregoing object which is secured to the brake shoes in such a way as to prevent vibration or rattling of the assembled parts.

A further object is to provide a brake lining replacement unit which is of simple construction, yet durable and highly efficient for the purposes intended.

An important feature of this invention resides in the provision of a brake lining supporting band which has an inwardly rolled edge which embraces the edge of a brake shoe.

Another feature of this invention resides in the provision of a structure in accordance with the foregoing feature, together with recesses in the rolled edge for receiving the brake shoe guides.

Yet another feature of this invention resides in the provision of a pair of tabs on the other edge of the band, which tabs prevent lateral displacement of the band relative to the brake shoe, together with springs which are detachably secured to registering tabs of opposed brake bands so as to retain the bands firmly seated on the shoe, and also to urge the shoes out of their braking position.

These, together with various ancillary objects and features are attained by this device, a preferred embodiment of which has been illustrated by way of example only in the accompanying drawings wherein:

Figure 1 is a front elevational view of the brake lining replacement unit attached to the brake shoes of a vehicle;

Figure 2 is a perspective view of one of the brake lining supporting bands;

Figure 3 is a fragmentary front elevational view of the band shown attached to a brake shoe, the brake lining being shown in phantom so that the brake shoe guides would be visible;

Figure 4 is a fragmentary sectional view taken substantially on the plane 4—4 of Figure 3;

Figure 5 is a perspective detail view of one of the bands showing the recesses for receiving the brake shoe guides;

Figure 6 is a fragmentary view of a vehicle axle showing the assembly of the brake shoes, the replacement units, and the brake drum shown in section; and Figure 7 is a fragmentary view of a brake shoe with the replacement unit attached thereto showing the details of the shoe engaging tabs on the end of the band.

Referring now more particularly to the accompanying drawings wherein like numerals designate similar parts throughout the various views it will be seen that there is provided a brake lining replacement unit indicated generally by the numeral 10 which is adapted to be mounted upon a conventional wheel brake assembly 12.

The wheel brake assembly consists generally of a backing plate 14 which is mounted as by bolts 16 to the axle 18 of a vehicle. Movably mounted on the backing plate 14 are brake shoes 20, which, as is conventional, consist of a webbed portion 22, and an arcuate brake lining supporting member 24. These shoes may be either pivotally mounted as by pins 26, or otherwise mounted so as to be selectively movable into engagement with the brake drum 28.

Brake shoe guides 30 are also provided to laterally space the brake shoes 20 from the backing plate 14, which guides are generally formed integrally with the backing plate 14.

A conventional hydraulic cylinder 32 or other actuator is operatively connected to the shoes, as by opposing piston rods 34, to selectively urge of the shoes into their braking position. A brake shoe return spring 36 is attached to opposed brake shoes to return the latter to their normal position. Thus far the structure is conventional and forms no part of this invention.

In order that brake linings may be readily replaced on the brake shoes there is provided an arcuate brake lining supporting band 38 which may be readily attached to, or detached from the brake shoes 20. To this band there is secured a brake lining 40, either by the conventional rivets or by bonding of the brake lining to the band 38.

This band 38 is preferably provided with an inwardly rolled edge 42 which is adapted to overlie the brake shoe 20. In order that the lateral spacing of the brake shoes from the backing plate 40 will not be altered, it is intended that the rolled edge be suitably recessed as at 44 so as to slidably receive the brake shoe guides 30.

Obviously the edges of the brake shoe guides 30 could be so constructed that a pair of opposed edges of the brake shoe guide would lie parallel to the path of travel of the brake shoe as the latter is reciprocated into and out of braking position so that the transversely extending edges of the recesses 44 would be slidably and guidably engaged by the edges of the brake shoe guide. This construction would thus transfer part of the braking load that is applied to the replacement unit, directly to the backing plate 14 through the guides 30, instead of being transferred through the brake shoe 20 by means of the pivot pin 26 to the backing plate.

The end portions 39 of the band 38 extends beyond the length of the brake lining supporting members and are adapted to be rolled inwardly to form brake shoe engaging hooks 46. However, in order that the web 22 of the brake shoe does not interfere with the rolling of the ends of the band inwardly to form hooks, the ends of the band may be suitably slotted as at 48 to accommodate the web.

The edge of the band 38 opposite to the rolled edge 42 is provided with tabs 50 which extend inwardly therefrom, the tabs overlying the edge of the brake lining supporting member so as to prevent lateral shifting movement of the band relative to the shoe. These tabs, for reasons which will become apparent as the following description proceeds, are spaced inwardly from the ends of the band 38 and are also spaced from the center thereof. The tabs 50 are provided with bores 52, which bores detachably receive a spring 54 having hooked portions 56 on the ends thereof. Each spring 54 is terminally attached to the registering tabs 50 of the opposed bands 38. As is readily apparent, the springs 54 urge the band into seating engagement on the brake shoes 20, and by reason of the placement of the tabs intermediate the ends of the band, a snug fit between the central portion of the band 38 and the brake shoe is accomplished. Further, the springs 54 urge the brake shoes out of their braking position, and obviously could be so constructed as to eliminate the necessity of the brake shoe return spring 36.

The brake lining replacement units may be attached to shoes by leaving the end portion 39 of one end of the band 38 unbent, as shown in Figure 5, and the band then slipped onto the shoe from the end thereof, the end portion 39 then being bent to form hooks 46 which overlie the brake shoe. Alternatively, the tabs 50 may be left unbent, and the band 38 slipped over the brake shoe 20 from the side thereof, the tabs then being bent inwardly so as to embrace the edge of the brake lining supporting member 24.

From the foregoing it is thought the construction and operation of the device will be readily understood, and further discussion is believed to be unnecessary. However, since numerous modifications will readily occur to those skilled in the art after a consideration of the foregoing specification and accompanying drawings, it is not intended to limit the invention to that shown and described, but all suitable modifications may be resorted to falling within the scope of the appended claims.

Having described the invention, what is claimed as new is:

1. In a vehicle brake assembly including a backing plate, brake shoe guides on said backing plate, a pair of brake shoes movably mounted on said plate in sliding engagement with said guides, a brake lining replacement unit comprising a pair of arcuate bands having a lining attached to the convex surface thereof, brake shoe engaging hooks on one longitudinal edge and on the ends of said bands, a tab on the other edge of each of said bands overlying the edge of the brake shoes, a spring terminally attached to the registering tabs of opposed brake bands yieldingly urging said bands into engagement with the brake shoes.

2. In a vehicle brake assembly including a backing plate, brake shoe guides on said backing plate, a pair of brake shoes movably mounted on said plate in sliding engagement with said guides, a brake lining replacement unit comprising a pair of arcuate bands having a lining attached to the convex surface thereof, an inwardly rolled edge on said band having recesses therein for receiving the brake shoe guide, a pair of tabs on the other edge of said band intermediate the ends thereof, spring means terminally attached to registering tabs of opposed brake bands, and brake shoe engaging hooks on the ends of said bands.

3. A brake lining replacement unit comprising a pair of opposed arcuate bands each having a lining attached to the convex face thereof, brakeshoe engaging hooks on the ends and one longitudinal edge of each of said bands, a tab on the other longitudinal edge of each of said bands, and spring means terminally attached to the tabs on said opposed bands for yieldingly biasing the bands into engagement with said brakeshoe and out of engagement with a brake drum.

JERRY M. BUCCINO.
JULIUS J. BUCCINO.

REFERENCES CITED

The following references are of record in the file of this patent:

UNITED STATES PATENTS

| Number | Name | Date |
|---|---|---|
| 1,620,030 | Krieg | Mar. 8, 1927 |
| 1,847,389 | Fawick | Mar. 1, 1932 |
| 1,903,723 | Palmer | Apr. 11, 1933 |
| 1,950,260 | Nelson | Mar. 6, 1934 |
| 2,027,823 | Hoffman | Jan. 14, 1936 |
| 2,037,109 | Berry | Apr. 14, 1936 |
| 2,100,174 | Ruffino | Nov. 23, 1937 |
| 2,128,467 | Merritt | Aug. 30, 1938 |

FOREIGN PATENTS

| Number | Country | Date |
|---|---|---|
| 372,169 | Italy | June 19, 1939 |